United States Patent [19]

Li

[11] Patent Number: 4,551,317

[45] Date of Patent: Nov. 5, 1985

[54] PHOSPHONITRILIC HALIDE POLYMERS

[75] Inventor: Hsueh M. Li, Baton Rouge, La.

[73] Assignee: Ethyl Corporation, Richmond, Va.

[21] Appl. No.: 489,414

[22] Filed: Apr. 28, 1983

Related U.S. Application Data

[63] Continuation-in-part of Ser. No. 447,720, Dec. 7, 1982, Pat. No. 4,447,408, which is a continuation-in-part of Ser. No. 314,522, Oct. 26, 1981, Pat. No. 4,374,815.

[51] Int. Cl.$^4$ ............................................. C01B 25/10
[52] U.S. Cl. ................................................... 423/300
[58] Field of Search ......................................... 423/300

[56] References Cited

U.S. PATENT DOCUMENTS

| | | | |
|---|---|---|---|
| 2,872,283 | 2/1959 | Taylor | 423/300 |
| 3,359,080 | 12/1967 | Ridgeway et al. | 423/300 |
| 3,443,913 | 5/1969 | Bieniek et al. | 423/300 |
| 3,545,942 | 12/1970 | Rice et al. | 423/300 |
| 4,374,815 | 2/1983 | Li | 423/300 |

OTHER PUBLICATIONS

Lund et al., *J. Chem. Soc.* (1960), 2542–2547.

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

Halophosphazene polymers such as linear phosphonitrilic chloride polymers are prepared in two stages by (i) heating a nitrogen source (e.g., $NH_3$; $NH_4Cl$; etc.) with an excess of a phosphorus source (e.g., $PCl_5$; $PCl_3 + Cl_2$; $P + Cl_2$; etc.) so that hydrogen halide is evolved and halophosphazene is formed, and (ii) heating at least a portion of the halophosphazene with at least a stoichiometric amount (preferably an excess) of a nitrogen source (e.g., $NH_3$; $NH_4Cl$; etc.) so that hydrogen halide is evolved and halophosphazene polymer of higher molecular weight is formed. Preferably, a third stage is utilized wherein the resultant halophosphazene polymer is then heated, most preferably in an inert solvent or diluent which enhances the fluidity of the reaction mixture, to increase the molecular weight of the polymer.

37 Claims, No Drawings

PHOSPHONITRILIC HALIDE POLYMERS

REFERENCE TO RELATED APPLICATIONS

This is a continuation-in part of my copending application, Ser. No. 447,720, filed Dec. 7, 1982, now U.S. Pat. No. 4,447,408, which in turn is a continuation-in-part of my still earlier application, Ser. No. 314,522, filed Oct. 26, 1981, now U.S. Pat. No. 4,374,815, issued Feb. 22, 1983.

TECHNICAL FIELD

This invention relates to a process for producing linear phosphonitrilic halide polymers. More particularly this invention relates to a process in which such polymers are produced from phosphonitrilic halide oligomers of lower molecular weight.

BACKGROUND

The customary method for the preparation of linear phosphonitrilic chloride polymers involves ring-opening polymerization of phosphonitrilic chloride trimer. Although workable, this method suffers from the fact that for satisfactory results to be achieved, highly pure cyclic phosphonitrilic chloride trimer must be used as the monomer. Such material is difficult and expensive to prepare.

Heretofore some work has been devoted to forming phosphonitrilic chloride polymers from lower molecular weight phosphonitrilic chloride oligomers. For example in J. Chem. Soc. 1960, 2542-7, Lund et al report an experiment in which a linear phosphonitrilic chloride oligomer of the formula $(PNCl_2)_{11}PCl_{4.2}$ was heated with ammonium chloride in sym-tetrachloroethane under reflux. Polymerization occurred after 5.5 hours, at which time the amount of hydrogen chloride evolved corresponded to the composition $(PNCl_2)_{10.6}PCl_5$. The rubbery product was extracted with light petroleum giving a significant quantity of a dark oil containing 10.5 percent $PNCl_2$ trimer, the remainder of the oil consisting of cyclic polymers higher than the heptamer.

Moran in J. Inorg. Nucl. Chem. 30. 1405-13 (1968) investigated the thermal polymerization of the linear compound $[Cl(PCl_2=N)_3PCl_3]PCl_6$ in evacuated sealed tubes at 300° C. for 5 hours and at 350° C. for 5 hours. The phosphorus NMR spectrum of both samples indicated that polymers of other chain lengths were formed. The results in the 300° C. case suggested to Moran that polymerization to the longer chain length compound $[Cl(PCl_2=N)_6PCl_3]PCL_6$ probably occurred. The NMR spectrum of the sample heated at 350° C. indicated to Moran that polymers of both longer and shorter chain lengths were formed.

G. Allen et al in Polymer 11, 31-43 (1970) report attempts to prepare linear $PNCl_2$ polymer by reacting $PCl_5$ with ammonium chloride in ortho-dichlorobenzene, the ammonium chloride being introduced by stepwise addition to the reaction mixture. They were in hopes that the following reactions would occur:

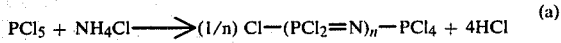  (a)

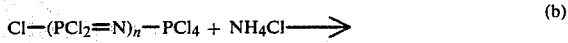  (b)

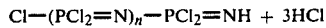

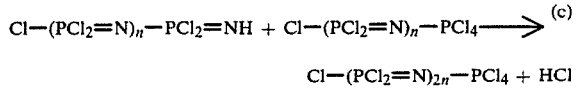  (c)

However they obtained very low molecular weight polymer (intrinsic viscosity of trifluoroethoxy derivative was below 0.05 dL/g). When they tried to increase the molecular weight of the polymer product by reacting it with $NH_4Cl$ in o-dichlorobenzene solvent, they obtained a crosslinked material.

U.S. Pat. No. 3,443,913 discloses a method wherein linear $(PNCl_2)_{3-15}$ oligomers are heated at 240°–260° C. to produce linear phosphonitrilic chloride polymers having a molecular weight between 3,000 and 10,000. However, this process involves heating for long periods of time, the endpoint of the polymerization occurring about 40 to 60 hours after heating has been initiated. The product obtained via this process is reported to be a dark orange viscous oil. See also James M. Maselli, Thomas Bieniek and Rip G. Rice (W. R. Grace and Company), *Phosphonitrilic Laminating Resins*, Air Force Materials Laboratory, Technical Report AFML-65-314; Wright-Patterson Air Force Base, Ohio: June, 1965, pages 18–19, which describes this same process. At page 47 of this report Maselli et al describe an experiment wherein oligomeric phosphonitrilic chloride was placed in a resin kettle fitted with a nitrogen inlet, stirrer and exhaust tube condenser. The kettle was heated to 250°±10° C. for a total of 55 hours while the polymeric $(PNCl_2)_n$ was stirred under a blanket of dry nitrogen. Samples of the reaction material were taken at selected intervals of time during the heating for molecular weight determination. The resulting data were as follow:

| Time (Hours) | Molecular Weight (VPO) |
|---|---|
| Start | 700 |
| 10 | 1200 |
| 40 | 3200 |
| 55 | 6900 |

According to the authors, when heating was continued for an additional 8 hours at temperatures in excess of 250° C., the viscous, soluble oil (molecular weight 6900) was converted to the familiar insoluble "inorganic rubber".

In U.S. Pat. No. 3,545,942 which in part discloses a method of thermally stabilizing phosphonitrilic chloride oligomers by heating them in an inert atmosphere for 2 to 8 hours at 240° to 260° C., Rip G. Rice et al indicate that prolonged heating of the oligomer can result in the formation of an "inorganic rubber". A decade earlier Lund et al (op. cit.) referred to an experiment in which heating of a linear phosphonitrilic chloride oligomer in tetrachloroethane solution resulted in polymerization after 29 hours.

In prior applications Ser. No. 956,227 filed Oct. 30, 1978 and Ser. No. 176,926 filed Aug. 11, 1980, a distinctly superior thermal polymerization process is described wherein linear phosphonitrilic chloride oligomer is heated to 275° to 350° C. for 1 to 20 hours while concurrently withdrawing phosphorus pentachloride vapor from the liquid phase. A similar procedure is described in Japanese Laid-Open Application (Kokai) No. 55-27,344 published Feb. 27, 1980. In this case a linear phosphazene oligomer usually having a degree of polymerization of 3 to 15 is heated under reduced pressure (usually less than 20 mm Hg) to produce linear polymers. Heating for five hours or more at 100°-300° C. is suggested. Unfortunately, phosphorus pentachloride vapor is extremely corrosive at elevated temperatures—it tends to rapidly corrode even the most expensive corrosion-resistant metals used in the manufacture of corrosion-resistant chemical reactors.

Japanese Kokai No. 55-56,130 published April 24, 1980 describes a method for producing phosphazene polymers in which a linear phosphazene oligomer is heated in the presence or absence of a solvent at 50° to 300° C. using a Lewis base such as urea, thiourea, polyurea or polythiourea as a catalyst for increasing molecular weight.

Japanese Kokai No. 55-56,129 published April 24, 1980 discloses a process in which ammonium chloride is used as the catalyst in a reaction involving heating phosphazene oligomer at 150°-350° C. in a closed system. For example, a solution of linear and cyclic phosphonitrilic chloride oligomers in dichlorobenzene containing a small amount of ammonium chloride catalyst was heated at 255° C. for 10 hours in a sealed tube to form the polymer.

Japanese Kokai No. 55-25,475 published Jan. 23, 1980 describes formation of phosphazene polymers by reacting a phosphorus source (e.g., $P+Cl_2$; $PCl_3+Cl_2$; $PCl_5$) with a nitrogen source (e.g., $NH_3$; $NH_4Cl$) in any of three reaction systems:

(1) In a solvent that does not dissolve the phosphazene polymers, such as an aliphatic hydrocarbon or alicyclic hydrocarbon that is resistant to halogenation.

(2) In an undiluted (concentrated) reaction system having a small quantity (250 mL or less per mole of P source reactant) of a solvent capable of dissolving the phosphazene polymers that is resistant to halogenation, such as a halogenated aromatic hydrocarbon.

(3) In a phosphazene oligomer as the solvent. Japanese Kokai No. 55-65,228 published May 16, 1980 describes a method for producing phosphazene polymers in which a mixture of linear phosphazene oligomer, which has been stabilized with phosphorus pentachloride, hydrogen chloride or a metal halide, and cyclic phosphazene oligomer, is heated at 150° to 350° C. in a closed system having a solvent or non-solvent in the presence of a Lewis base catalyst. Urea, thiourea, polyurea, and polythiourea are examples of Lewis base catalysts used.

Japanese Kokai No. 55-50,027 published April 11, 1980 discloses performing thermal ring-opening polymerization of cyclic phosphazene oligomers in the presence of linear phosphazenes stabilized with a metal halide, notably the linear oligomers formed as by-products when synthesizing the cyclic oligomers with metals or metal salts as catalysts. Such linear oligomers are indicated to have a degree of polymerization in the range of 2 to 100. Japanese Kokai No. 55-60,528 published May 7, 1980 discloses a process wherein phosphazene polymers are formed by heating phosphazene oligomer at 150° to 350° C. in a closed system in the presence of a Lewis base such as urea, thiourea, polyurea or polythiourea. The phosphazene oligomer is a mixture of linear phosphazene oligomers (5 to 95 weight percent; stabilized with phosphorus pentahalide or hydrogen halide) and cyclic phosphazene oligomer.

Japanese Kokai No. 55-43,174 published March 26, 1980 describes a process for producing phosphazene polymers in which cyclic phosphazene oligomers are subjected to thermal ring-opening polymerization in the presence of linear phosphazenes which have been stabilized by phosphorus pentahalides or hydrogen halides.

Despite the variety of approaches studied, no completely satisfactory method for producing linear phosphonitrilic chloride polymers from linear phosphonitrilic chloride oligomers has been reported to date. Among the unsolved problems or shortcomings plaguing the prior methods noted above are the following:

formation of polymers of molecular weight lower than desired formation of impure or cross-linked polymers having undesired properties or characteristics requirement for long reaction or polymerization periods with consequent low reactor productivity formation of highly corrosive coproducts such as phosphorus pentachloride at extremely high temperatures which necessitates use of very expensive corrosion-resistant reactors necessity of solvent extraction operations to remove cyclic oligomeric by-products and other time-consuming, difficult and costly separation procedures and their attendant problems formation of the desired polymer in yields lower than desired need for very high reaction or polymerization temperatures.

A welcome contribution to the art would be the provision of a process avoiding these difficulties and shortcomings.

The Invention

In accordance with this invention a process is provided whereby halophosphaZene polymers such as phosphonitrilic chloride polymers can be readily produced from halophosphazene of lower molecular weight such as phosphonitrilic chloride oligomers. The problems, difficulties and shortcomings of prior procedures noted above are eliminated or at least significantly reduced. Polymers of desired molecular weights (e.g., average degrees of polymerization in the range of 20 to 1000 or more) can be formed in good yield and high purity at relatively moderate temperatures in relatively short reaction periods. The highly corrosive phosphorus pentachloride is not formed and the process is capable of being performed in relatively simple and economical reaction equipment. Complex separation procedures are not required.

To achieve these and other attendant technical and economic advantages of this invention, use is made of an improved process involving at least two stages. In the first stage an excess of a phosphorus source such as phosphorus pentachloride is heated with a nitrogen source such as ammonia or ammonium chloride so that hydrogen halide (e.g., HCl) and halophosphazene of lower molecular weight such as phosphonitrilic chloride oligomer are formed. In the second stage the molecular weight of the halophosphazene intermediate is increased by heating a mixture of the halophosphazene intermediate with at least a stoichiometric amount (preferably an excess) of a nitrogen source so that hydrogen halide is formed and the halophosphazene is polymerized.

More particularly, in one of its embodiments this invention involves preparing halophosphazene polymers such as linear phosphonitrilic chloride polymers by (i) heating a nitrogen source (e.g., $NH_3$; $NH_4Cl$; etc.)

with an excess of a phosphorus source (e.g., PCl$_5$; PCl$_3$+Cl$_2$; P+Cl$_2$; etc.) so that hydrogen halide is evolved and halophosphazene is formed, and (ii) heating at least a portion of the halophosphazene with at least a stoichiometric amount (preferably an excess) of a nitrogen source (e.g., NH$_3$; NH$_4$Cl; etc.) so that hydrogen halide is evolved and halophosphazene polymer of higher molecular weight is formed. In other words, in both (i) and (ii) hydrogen halide is formed and removed from the reaction mixture during the respective reactions.

Thus, pursuant to this invention the first stage of the process, i.e., the reaction between the phosphorus source and the nitrogen source, is conducted in the presence of an excess of the phosphorus source relative to the nitrogen source so as to suppress the formation of cyclic halophosphazene and to enhance the formation of linear (i.e., non-cyclic) halophosphazene, and then in a second stage, the halophosphazene is polymerized by heating the same with at least a stoichiometric amount (preferably an excess) of a nitrogen source so that halophosphazene polymer and hydrogen halide are formed. Preferably, a third stage is utilized wherein the resultant halophosphazene polymer is then heated, most preferably in an inert solvent or diluent which enhances the fluidity of the reaction mixture, to increase the molecular weight of the polymer.

A feature of this invention is the fact that the halophosphazene of lower molecular weight formed in the first stage is enriched in non-cyclic halophosphazene species and when used in the second stage with at least a stoichiometric amount (preferably an excess) of the nitrogen source reactant, results in the formation of substantially linear halophosphazene polymer having desirable properties. Accordingly, the halophosphazene subjected to this polymerization may either be a mixture of non-cyclic and cyclic halophosphazene species or it may consist essentially of a mixture of non-cyclic halophosphazene species with little or no cyclic components admixed therewith. If desired, the halophosphazene product formed in the first stage reaction may be extracted with a solvent such as hexane or may be otherwise treated so as to remove all or a portion of the cyclic species, or it may be used as formed in the ensuing polymerization reaction. From the standpoints of ease of processing and process economics, use of a mixture of linear (i.e., non-cyclic) and cyclic halophosphazene oligomers is preferred provided that the mixture is enriched in (i.e., contains more than 50 mole percent of) linear oligomers. Particularly preferred mixtures contain from about 60 to about 90 mole percent of linear oligomers, the balance being essentially cyclic oligomers.

Preferably, the halophosphazene formed in the first stage will have an average degree of polymerization of at least 3 and more preferably at least 4. In other words, the product from the first stage reaction is preferably an oligomer—normally a mixture of oligomer molecules of somewhat differing molecular weights—having a number average degree of polymerization of 3 and preferably 4 or more. Thus preferably the product formed in the first stage is at least predominantly oligomer which may be represented by the formula:

$$[X-(PX_2=N)_n-PX_3]^+PX_6^-$$ 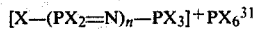

wherein n is a numeral which averages at least 3 and preferably at least 4, e.g., a numeral in the range of 3 to 15 or more and preferably in the range of 4 to 15 or more, and wherein X is halogen, preferably fluorine, chlorine or bromine (or a mixture of two or more of these). For producing polymers having the best thermal stabilities, X is more preferably either fluorine or chlorine (or both). Most preferably, X is chlorine as the resultant polymers are more economical to prepare and have satisfactory stability and good chemical reactivity for use as intermediates in the synthesis of substituted phosphazene polymers.

Minor quantities of linear oligomer of the formula:

$$[X-(PX_2=N)_n-PX_3]^- X^-$$ 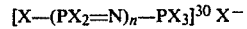

in which n and X are as defined above may also be present in the product from the first stage reaction.

Cyclic oligomers which may be (and usually are) formed in the first stage reaction may be represented by the formula:

$$(PNX_2)_n$$ 

wherein X is as defined above and n is a numeral of at least 3, e.g., a numeral in the range of 3 to about 8 or more.

If desired, the first stage reaction may be performed under conditions yielding halophosphazenes of even lower molecular weights than those discussed above. For example, halophosphazenes suitable for use polymerization may be produced having the formula:

$$[X-(PX_2=N)_nPX_3]^- PX_6^-$$ 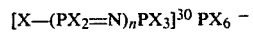

wherein n is 1 or 2 and X is as above described.

Methods for the preparation of halophosphazenes as above described are well known and reported in the literature. However, so far is known, this invention is the first instance wherein oligomers are produced under conditions conducive to the formation of open-chain species and suppressive of the formation of the cyclic species, and the product enriched in the non-cyclic species is polymerized in the presence of a stoichiometric or an excess amount of the nitrogen source reactant so as to produce substantially linear halophosphazene polymers having desirable properties.

One typical procedure for preparing the oligomer in the first stage reaction involves refluxing a mixture of phosphorus pentachloride and ammonium chloride in a suitable solvent for a suitably long reaction period and distilling off the solvent, preferably under reduced pressure. In this manner a product composed of a mixture of linear and cyclic oligomers is formed. By extracting the oligomeric product with a suitable extraction solvent such as hexane, residual amounts of the reaction solvent and cyclic oligomers formed during the reaction may be separated, if desired. One such procedure successfully used in practice involves forming a mixture of about 6.0 kg of phosphorus pentachloride, about 1.2 kg of ammonium chloride and 3 liters of monochlorobenzene. Such mixture is refluxed in a 12-liter reactor at atmospheric pressure for 4 days at about 131° C. Hydrogen chloride evolved during the reaction is absorbed in aqueous scrubbers. At the end of this time the chlorobenzene solvent is stripped off under reduced pressure at 60 to 80° C. This product itself may be employed as a feed to the second stage of the process of this invention. Alternatively, the stripped product is extracted with hexane in order to remove residual amounts of chlorobenzene solvent and cyclic oligomers. Such a product is also suitable for use in practicing the second stage of the process of this invention. Another very useful method for preparing oligomers suitable for use in the practice of the second stage of this invention is described in U.S. Pat. No. 4,198,381, the disclosure of which is incorporated herein.

The phosphorus source as used in the first stage is preferably $PCl_5$, or the combination of $PCl_3$ and $Cl_2$, or a combination of all three of them. However, a considerable number of other equivalent materials can be used, such as $PF_5$, the combination of $PF_3$ and $F_2$, $PBr_5$, the combination of $PBr_3$ and $Br_2$, $PI_5$, the combination of $PI_3$ and $I_2$, the combination of P and $Cl_2$, the combination of P and $Br_2$, and the like. The phosphorus source reactants are essentially oxygen free although small amounts of oxygenated derivatives such as $POCl_3$ or the like in the phosphorus source reactant appear innocuous. The quantities in which the phosphorus source material is used are not critical provided that a sufficient amount is introduced into the reaction mixture to provide more than the stoichiometric amount required to react with the nitrogen source material present in the system. Thus in general, the mole ratio of phosphorus source:nitrogen source will be above 1:1, and usually in the range of up to about 3:1. It is preferred however, that the reaction be conducted such that this mole ratio is in the range of from 1.1:1 to 1.5:1. When employing a phosphorus pentahalide and an ammonium halide (e.g., $PCl_5$ and $NH_4Cl$) as the reactants, the entire amount of the reactants may be charged into the reaction vessel at the start of the reaction. However, these reactants can be introduced into the reaction mixture on an incremental or continuous basis during the course of all or a portion of the first stage reaction, if desired. When employing a phosphorus trihalide, free halogen, and ammonia or an ammonium halide as the reactants in the first stage, it is preferable to utilize the feeding techniques described in U.S. Pat. No. 4,198,381.

The nitrogen source as used in first stage is preferably ammonia or ammonium chloride, or both. However, other equivalent materials can be used, such as ammonium fluoride, ammonium bromide, and ammonium iodide.

Temperatures used in this first stage reaction fall within the range from about 50° C. to about 200° C., and preferably in the range of from about 70° C. to about 150° C. In conducting this process, it is preferable to employ an inert reaction diluent such as a halogenated hydrocarbon, a nitroaromatic hydrocarbon, or the like, or a mixture of such solvents.

The second stage of the process of this invention involves polymerizing at least a portion of the halophosphazene enriched in the non-cyclic species by heating such halophosphazene with at least a stoichiometric amount (preferably an excess) of the nitrogen source material so that hydrogen halide is evolved. In this way polymerization is caused to take place along with the formation of hydrogen halide. Additionally, cyclic halophosphazene such as cyclic phosphonitrilic chloride oligomer is produced. An important feature of this invention is that the hydrogen halide is removed from the reaction mixture, preferably essentially as soon as it is formed. This is accomplished by performing the reaction in an open reaction system, "open" in the sense that the hydrogen halide is able to leave or be carried away from the reaction zone such as by a sweep of inert gas, application of a vacuum, or the like. The process may also be carried out under pressure, provided that the hydrogen halide is continuously or at least periodically bled from the reaction system.

It is also preferred to separate at least a portion of the cyclic phosphonitrilic halide oligomers from the heated reaction mixture during the course of the second stage of the process, viz., the polymerization reaction. Alternatively, phosphonitrilic halide oligomers may be separated from the phosphonitrilic halide polymer after completion of the second stage reaction. In either case at least a portion of the recovered cyclic oligomer may be used as feed to the polymerization reaction, for example by recycle or otherwise. Still another alternative involves leaving all or a portion of the cyclic oligomers in the polymerization reaction product from the second stage reaction and subjecting this mixture with or without addition of another solvent or diluent to the third stage operation referred to above.

To effect separation of cyclic halophosphazene oligomer (e.g., phosphonitrilic chloride oligomer) during the course of the polymerization reaction, use may be made of several different process techniques. For example, all or a portion of the second stage reaction may be performed in a boiling inert organic liquid whereby the liquid vapors drive off the cyclic oligomer. Another method is to perform all or a portion of the second stage reaction at a reduced pressure so that at the temperature employed the cyclic oligomer is distilled from the reaction mixture. Still another way of effecting the removal of the cyclic oligomer is to sweep the heated second stage reaction mixture with an inert vapor or gas either at subatmospheric, atmospheric or superatmospheric pressures. In this way the entrained cyclic oligomer is carried away from the polymerization reaction zone during the course of the reaction. In all such cases it is desirable that the second stage reaction mixture be suitably agitated both during the reaction and during the removal of the cyclic oligomer.

Instead of removing the cyclic oligomers during the course of the second stage reaction, the cyclic oligomers may be separated from the halophophazene polymer after completion of the second stage. While various methods may be used for effecting this separation, it is preferable to extract the polymeric reaction product formed in the second stage reaction with a suitable inert solvent such as hexane or the like.

The second stage of the process may be performed in the presence or absence of an inert organic liquid as diluent. In most cases it is preferable to conduct all or a portion of the second stage in bulk (i.e., in the substantial absence of added reaction solvent or diluent) as this reduces the size requirements for the polymerization reaction vessels.

When employing solvents in the second stage, use may be made of such materials as saturated cycloaliphatic hydrocarbons (e.g., cyclohexane, methylcyclohexane, 1,2-dimethylcyclohexane, etc.), aromatic hydrocarbons (e.g, toluene, xylenes, trimethylbenzenes, ethylbenzene, methylnaphthalenes, etc.), chlorinated hydrocarbons (e.g., 1,4-dichlorobutane, tetrachloroethane, chlorobenzene, dichlorobenzenes, etc.), and other similar inert solvents.

A wide variety of nitrogen source materials may be used in the second stage of the process. For example, use may be made of ammonia, ammonium chloride, ammonium fluoride, ammonium bromide, ammonium iodide, ammonium acetate, ammonium thiocyanate, and the like. Use of ammonia or ammonium chloride (or both) is preferred. It is not necessary to use the same nitrogen source in the first and second stages. To illustrate, ammonium chloride may be used as the nitrogen source in the first stage and ammonia may be used as the nitrogen source in the second stage.

When employing ammonium halide or like particulate materials as the nitrogen source material in the second stage reaction, the reaction time of this polymerization reaction can be significantly reduced by reducing the particle size of the ammonium halide used. For example, conversion of linear oligomer to linear polymer using ammonium chloride having a relatively small mean particle size of about 86 microns may be completed at a temperature of about 160° C. after about one hour. On the other hand, when ammonium chloride having a relatively large mean particle size of about 115 microns is used, the polymerization rate at the same reaction temperature is slower and the yield of desired polymeric product is lower. The mean particle size of the ammonium chloride is preferably within the range of about 1 micron to about 100 microns and most preferably within the range of about 1 micron to about 90 microns.

In accordance with other preferred embodiments of this invention the ammonium halide is further characterized by satisfying additional particle size parameters. Such parameters may be represented by the following designations:

PH, which stands for 10 volume % of particles greater than the value of the microns stated PM, which stands for 50 volume % of particles greater than the value of the microns stated PS, which stands for 90 volume % of particles greater than the value of the microns stated.

For example, a PH of 145 microns, a PM of 83.8 microns and a PS of 37.4 microns means that the sample contains 10 volume % of particles greater than 145 microns, 50 volume % greater than 83.8 microns and 90 volume % greater than 37.4 microns, respectively.

Thus in accordance with these further preferred embodiments the ammonium halide (preferably ammonium chloride) employed has in addition to the foregoing Mean Values a PH below about 180 microns and most preferably below about 160 microns, a PM below about 90 microns and most preferably below about 85 microns, and a PS below about 45 microns and most preferably below about 40 microns.

Ammonium chloride having a relatively small particle size may be prepared, for example, by reacting hydrogen chloride gas with ammonia gas. If the ammonium chloride is formed and used in situ without first isolating the ammonium chloride, the particle size will have a Mean Value less than about 86 microns —i.e., a Mean Value as low as about 5 microns.

As noted above, at least a stoichiometric amount (preferably an excess) of the nitrogen source material is employed in the second stage of the process. Accordingly, the quantities in which the nitrogen source material is used are not critical provided that a sufficient amount is introduced into the reaction mixture to provide at least the stoichiometric amount relative to the quantity of halophosphazene oligomer being reacted. The entire amount of the nitrogen source material being used in the reaction may be charged into the reaction vessel at the start of the reaction. However, in order to control the reaction the nitrogen source material may be introduced into the reaction mixture either periodically on an incremental basis or on a continuous basis during the course of all or a portion of the second stage.

The second stage is conducted at a temperature sufficiently high to cause the formation of hydrogen halide. Therefore, the temperatures employed will usually fall within the range of from about 100° C. to about 350° C. Preferably, the average temperature employed in the second stage will fall within the range of from about 120° C. to about 280° C.

The first and second stages may be conducted on a more or less continual basis simply by introducing additional nitrogen source material to the reaction mixture from the first stage.

Once the second stage reaction has been completed, the polymeric product may be recovered and purified by conentional procedures such as solvent extraction and the like. In a particularly preferred embodiment, the product from the second stage is subjected to the third stage processing in order to still further increase the molecular weight of the halophosphazene polymer. This optional but highly preferred third stage treatment is carried out by heating the resultant reaction mixture, preferably in an inert liquid solvent, at a suitably elevated temperature which on the average is usually (but not necessarily) higher than the average temperature employed in the second stage reaction, optionally in the presence of nitrogen source material of the type described above, preferably ammonia or ammonium chloride. The third stage is conducted for a time period sufficient to increase the molecular weight of the halophosphazene polymer. When ammonium chloride or like particulate nitrogen source material is used in the third stage, preferably it has a relatively small particle size as discussed above.

In the third stage as in the first and second stages of the process, a temperature high enough to cause the formation of hydrogen halide is employed. Thus, the third stage temperatures will generally fall within the range of from about 100° C. to about 350° C., and preferably the average temperature in the third stage will fall within the range of from about 120° C. to about 280° C. In accordance with one embodiment of this invention, a higher temperature is used in the third stage than in the second stage. The "higher temperature" used in the third stage is an average temperature that preferably is at least five and most preferably at least ten Centigrade degrees higher than the average temperature used in the prior second stage.

As in the case of the second stage, the third stage reaction should be performed so that hydrogen halide formed in the reaction is removed from the reaction system. This may be accomplished by performing the reaction in an open reaction system, "open" in the sense that the hydrogen halide is able to leave or be carried away from the reaction zone such as by a sweep of inert gas, application of a vacuum, or the like. The third stage processing may also be carried out under pressure, provided that the hydrogen halide is continuously or at least periodically bled from the reaction system.

Generally speaking, the longer the reaction time in the third stage, the higher the molecular weight of the resultant halophosphazene polymer. Accordingly, the reaction time for this reaction will depend to some extent on the desired molecular weight of the polymer and may be varied within relatively wide limits although ordinarily times in the range of about 1 to about 36 and preferably from about 4 to about 24 hours will usually be used. At least a portion of the third stage may be performed in the presence of a nitrogen source material of the type used in the second stage such as ammonia or ammonium chloride, or the like and such material(s) may be introduced into the reaction mixture at the start and/or during the course of the reaction. Alternatively, such material(s) may constitute residual nitrogen source materials remaining in the reaction mixture after completion of the second stage reaction.

A wide variety of inert solvents may be employed in the third stage. These include inert chloroaliphatic, cycloaliphatic, and aromatic solvents of various types, including mixtures of solvents. While various cycloalkanes, chloroalkanes and chlorocycloalkanes having appropriate boiling points are thus suitable for this operation, it is preferred to use an inert aromatic solvent such as aromatic hydrocarbons and chloroaromatic hydrocarbons having boiling points at least as high as the reaction temperature being used in the second stage. Preferred solvents of this type include toluene, xylenes, methylnaphthalenes, chlorobenzene, dichlorobenzenes, trichlorobenzenes, etc., as well as mixtures of such materials. The third stage preferably is conducted at elevated pressures with the hydrogen halide formed in the reaction being bled from the reaction system either continuously or at least periodically.

If desired, the second and third stages of the process may both be performed in the same solvent or mixture of solvents.

The amount of solvent used in the third stage is preferably regulated so as to keep the reaction mixture in a relatively concentrated solution while avoiding excessive gelation. Thus it is desirable to perform the third stage in a relatively concentrated reaction solution with periodic or continuous addition of solvent to maintain the reaction mixture in a fluid state as the reaction proceeds.

If it is desired to recover the linear phosphonitrilic chloride polymeric product from the reaction solvent used in the third stage, various techniques are available for use. For example, the solvent may be distilled off using an appropriate combination of reduced pressure and distillation temperature. Alternatively, the halophosphazene polymer may be precipitated from the solvent by the addition of the solution to a suitable non-solvent such as pentane or hexane. These and other similar techniques will be evident to those skilled in the art.

When it is desired to chemically convert the halophosphazene polymer into another type of phosphazene polymer, subsequent reactions with an appropriate reactant may be effected in the same reaction solvent as used in the third stage (or in the second stage, if a solvent is used therein). Indeed, in such cases it is unnecessary to isolate or recover the halophosphazene polymer formed in the second or third stages as the ensuing reaction(s) may be effected in the same solution. Alternatively, such subsequent reactions may be effected in a fresh solution and, if desired, in a different inert solvent.

In accordance with a preferred embodiment, the reaction miXture from the third stage reaction is extracted with a suitable inert solvent such as pentane, hexane or heptane in order to separate and recover the cyclic oligomers present in the reaction mixture. All or a portion of these recovered cyclic oligomers may be used in the second and/or third stage of the process.

The second and third stages may be conducted in separate reactors. A feature of this invention, however, is the fact that both stages may be performed in the same reaction vessel, provided of course that it is appropriately sized to handle the quantities of material involved in each stage. Thus in accordance with a preferred embodiment of this invention, both stages are conducted in the same reactor. It is further preferred to conduct the second stage in bulk and to introduce a solvent for the third stage into such reactor upon or near the completion of the second stage but otherwise perform the second and third stages as a more or less continual operation. Both of these stages (as well as the first stage) may be conducted in the presence of a solvent, if desired.

The practice and advantages of this invention will be still further apparent from the following illustrative examples which are not to be construed in a limiting sense.

EXAMPLE I

Stage (i): A mixture of about 6.0 kg of phosphorus pentachloride, about 1.2 kg of ammonium chloride and 3 liters of monochlorobenzene was formed. The mixture was refluxed in a 12-liter reactor at atmospheric pressure for 4 days at about 131° C. Hydrogen chloride evolved during the reaction was absorbed in aqueous scrubbers. At the end of this time the chlorobenzene solvent was stripped off under reduced pressure at 60° to 80° C. The stripped product was extracted with hexane in order to remove residual amounts of chlorobenzene solvent and cyclic oligomers.

Stage (ii): To a one liter, five-neck round bottom flask, cradled in a heating mantle and fitted with a mechanical stirrer, a thermometer, a nitrogen inlet tube and a gas/vapor outlet tube were added 250 g of the stripped and hexane-extracted oligomer formed in stage (i) and 25.6 g of ammonium chloride. This oligomer was a low molecular weight linear phosphonitrilic chloride oligomer having an average degree of polymerization (n in $[Cl—(PCl_2=N)_n PCl_3]^+ PCl_6^-$) falling in the range of 4 to 6. (The NMR spectrum of this oligomer indicated that about 7 percent of the oligomer had a degree of polymerization of 2 with the balance having a degree of polymerization ranging from 3 to 10.) The mixture was heated at 155°–165° C. for two hours, then the temperature was raised to 200° C. and nitrogen sweeping was started to carry away cyclic phosphonitrilic chloride oligomer formed during the reaction. The temperature was kept at 200 ±3° C. for about 4 hours and then at 200°–210° C. for 1¼ hours. During this time several small samples were withdrawn from the reaction mixture for $P^{31}$ NMR analysis to determine the residual content of the cyclic oligomers. The reaction was terminated at the end of the foregoing 1¼ hour period since the analyses indicated that the removal of the cyclic oligomers was essentially complete. The reaction yielded 163.3 g of viscous liquid linear phosphonitrilic chloride polymer. This was dissolved in 138 mL of monochlorobenzene (MCB) yielding 240 mL of a polymer solution.

Stage (iii): To increase the molecular weight of the polymer formed in stage (ii), 120 mL of the above phosphonitrilic chloride polymer solution, 70 mL of MCB and 0.9 g of ammonium chloride were introduced into a flask equipped as described in stage (ii) except that the gas/vapor outlet tube was replaced with a reflux condenser and an HCl outlet adapter and tubing. The mixture was heated at 131°–132° C. for about 4½ hours. During this time the reaction mixture had become more viscous due to the increase in molecular weight of the polymer and thus at that time 30 ml of MCB was added to reduce the viscosity of the reaction mixture. Eighty minutes later an additional 30 mL of MCB was added to thin the reaction mixture and the reaction was temporarily discontinued by turning off the heating system and the stirrer. Next morning the reaction was resumed. To accelerate the reaction, an additional 0.1 g of NH$_4$Cl was added. The temperature of the reaction mixture was raised to 131°–132° C. and kept at this temperature range for 2 hours. The reaction mixture was further thinned with 30 mL of MCB. The reaction was allowed to extend for an additional 30 minutes before being terminated. Since the reaction mixture was still quite viscous, 5 mL of 1-pentanol dissolved in 20 mL of MCB was added to reduce the viscosity of the polymer solution. The volume of the polymer solution was 486 mL and the weight of the phosphonitrilic chloride polymer in the solution was approximately 80 g.

To determine the molecular weight of the phosphonitrilic chloride polymer, a small sample of poly(phenoxyphosphazene) was produced from the above phosphonitrilic chloride polymer. To accomplish this, 102 mL of the above polymer solution was diluted with 100 mL of toluene, the diluted solution was allowed to stand overnight to allow a trace amount of unreacted NH$_4$Cl to settle, and the clear solution was then reacted with 0.32 mole of sodium phenoxide in 200 mL of diglyme for 24 hours at 110° C. In this operation 24.4 g of poly(phenoxyphosphazene) was formed. The intrinsic viscosity of the poly(phenoxyphosphazene) as measured in tetrahydrofuran (THF) at 25° C. was 0.49 dl/g.

EXAMPLE II

Stage (i): Same as Example I.

Stage (ii): The apparatus was similar to that described in stage (ii) of Example I except that the reactor was a 2 liter, five-neck round bottom flask instead of a 1 liter, five-neck round bottom flask.

A 603 g portion of the same low molecular weight linear phosphonitrilic chloride oligomer as described in Example I and 50 g of NH$_4$Cl were introduced into the reactor. The mixture was heated at 155°–160° C. for 2⅔ hours, and at 175°–180° C. for 3¼ hours. The nitrogen sweeping was then started and the temperature was raised to and kept at 200±2° C. for 2½ hours. An additional 8 g of NH$_4$Cl was added and the reaction was continued for another 1½ hours at 200°–210° C. Use of P$^{31}$ NMR analysis indicated that the removal of the cyclic phosphonitrilic chloride oligomer formed in the reaction was essentially complete and accordingly the reaction was terminated and the contents of the reactor were allowed to cool to about 100° C. 500 mL of o-dichlorobenzene (DCB) was added to dissolve the phosphonitrilic chloride polymer (434.4 g). The volume of the polymer solution was 730 mL.

Stage (iii): 135 mL of the above phosphonitrilic chloride polymer solution (containing about 80 g of the polymer), 2 g of NH$_4$Cl and 65 mL of DCB were added into the same reactor used in stage (iii) of Example I. The mixture was heated at 170° C. for 5 hours. The reaction medium was very viscous and began to climb up the shaft of the stirrer. The reaction was terminated immediately by turning off the heating and stirring devices. When the temperature of the contents had cooled to about 150° C., 10 ml of 1-hexanol mixed with 100 mL of DCB was added. The stirrer was turned on. In about 20 minutes the very thick honey-like mass had turned into viscous liquid. To reduce further the viscosity of the liquid, an additional 180 mL of DCB was added. The volume of the resultant phosphonitrilic chloride polymer solution was 490 mL. Approximately 24 g of insoluble gel-like material remained in the reactor. The weight of the polymer dissolved in the solvent was approximately 55 g.

Following the same procedure described in Example I, a small sample of poly(phenoxyphosphazene) was prepared for intrinsic viscosity and molecular weight determinations. The intrinsic viscosity of the polymer (THF; 25° C.) was 0.54 dl/g.

EXAMPLE III

This example illustrates the advantage of diluting the reaction mixture during the course of stage (iii) to prevent gelation as occurred in Example II.

A separate 135 mL portion of the same phosphonitrilic chloride polymer solution as used in stage (iii) of Example II, 2 g of NH$_4$Cl and 6 ml of DCB were heated in the same reactor of stage (iii) of Example II at 170° C. for 3⅔ hours. Thereupon 100 mL of DCB was added to thin the reaction medium. The reaction mixture was continuously heated at the same temperature for an additional 2 5/6 hours and diluted with two portions of 100 mL of DCB during this period of time. At the end of a grand total of 6½ hours of reaction at 170 ° C. the heating system was turned off and 50 mL of DCB was added to reduce the viscosity of the rather viscous polymer solution. When the temperature was at about 155° C., 6 mL of 1-hexanol mixed with 60 mL of DCB was added to further reduce the viscosity of the polymer solution. The reaction yielded 634 mL of the polymer solution containing 79 g of phosphonitrilic chloride polymer. No gel material remained in the reactor.

A small sample of poly(phenoxyphosphazene) was prepared as above. The intrinsic viscosity (THF; 25° C.) was found to be 0.60 dl/g.

EXAMPLE IV

In order to obtain an indication of the relative amounts of linear polymer, cyclic oligomer, and HCl formed in the stage (ii) procedure, stage (ii) was conducted while separately trapping the latter two by-products for assay. In particular, a 595 g portion of the same low molecular weight linear phosphonitrilic chloride oligomer as described in Example I and 50 g of NH$_4$Cl were introduced into the same reactor used in stage (ii) of Example II. The mixture was heated at 160° C. for 3 hours, and 170° C. for one hour. Nitrogen sweeping was then started to remove the cyclic phosphonitrilic chloride oligomer formed from the reaction. The temperature was raised to and kept at 180° C. for one hour, at 200–205° C. for one hour, and finally at 210° C. for 2 hours. The HCl gas generated during the reaction was absorbed in water and the HCl aqueous solution was titrated with standard NaOH solution. The cyclic oligomer as purged from the reaction vessel was trapped in toluene and upon completion of the reaction the toluene was evaporated and the cyclic oligomer residue weighed.

The reaction yielded 416.8 g of linear phosphonitrilic chloride polymer, 137 g of HCl and 20 g of cyclic phosphonitrilic chloride oligomers.

EXAMPLE V

Stage (i): Same as Example I.

Stage (ii): The apparatus was similar to that described in Example I except that the reactor was a 3 liter, five-neck round bottom flask instead of a 1 liter, five-neck round bottom flask.

A further 1.349 kg portion of the same low molecular weight linear phosphonitrilic chloride oligomer referred to in Example I and 127 g of NH$_4$Cl were heated in the above reactor at 160° C. under a nitrogen sweep for 2⅔ hours, at 170°–180° C. for 3 hours, at 190°–200° C. for one hour and 200°–210° C. for one hour and finally at 210°–220° C. for 4 hours. 950 mL of DCB was added to dissolve 918 g of phosphonitrilic chloride polymer product. The volume of the polymer solution was 1,445 mL.

Stage (iii): The apparatus was similar to that described in stage (iii) of Example I except that the reactor was a 5 liter, four-neck round bottom flask.

710 mL of the phosphonitrilic chloride polymer solution from stage (ii) of this Example, 900 mL of DCB and 12 g of NH$_4$Cl were heated at 170° C. for 6½ hours. Four 200-250 mL portions of DCB were added stepwise during the last 2½ hour period of the reaction to reduce the viscosity of the reaction medium. When the temperature of the viscous polymer solution was cooled to 135° C., 10 mL of 1-hexanol mixed with 50 mL of DCB was added to further reduce the viscosity of the polymer solution.

The reaction yielded 445 g of linear phosphonitrilic chloride polymer, and 3.5 g of HCl was captured in an aqueous trap. The concentration of the final polymer solution was 0.174 g/ml.

A small sample of poly(phenoxyphosphazene) was then prepared as above from this final phosphonitrilic chloride polymer solution. The intrinsic viscosity (THF; 25° C.) of the phenoxy substituted polymer was 0.61 dl/g.

EXAMPLE VI

Stage (i): Same as Example I.

Stage (ii): To a one liter, five-neck round bottom flask, cradled in a heating mantle and fitted with a mechanical stirrer, a thermometer, a nitrogen inlet tube and a gas/vapor outlet tube were added 250 g of another portion of the oligomer from stage (i) of Example I and 25.8 g of ammonium chloride. The mixture was stirred and gradually heated. The reaction started at about 160°–165° C. The temperature was then kept at 170°–175° C. for three hours. A small sample of the reaction mixture was withdrawn and analyzed. The P$^{31}$ NMR analysis of the reaction mixture indicated the following product composition:
Cyclic (PNCl$_2$)$_{3-4}$: 2.4%
Low linear PNCl$_2$ oligomer: 32.0%
Linear PNCl$_2$ polymer: 65.6%

Stage (iii): The temperature of the reaction mixture from stage (ii) was raised to 200° C. and nitrogen sweeping was started to separate cyclic phosphonitrilic chloride oligomer formed during the reaction. The conversion of the lower molecular weight linear phosphonitrilic chloride into higher molecular weight linear phosphonitrilic chloride polymer was complete in about four hours at 200° C. The third stage reaction was terminated at the end of 4.5 hours at 200° C. The resultant phosphonitrilic chloride polymer was then dissolved in toluene to leave unreacted (excess) ammonium chloride on the bottom of the flask. The yield of linear phosphonitrilic chloride polymer formed in the process was more than 60% based on starting phosphonitrilic chloride oligomer. A small sample of this polymer was converted to poly(phenoxyphosphazene) by reaction with sodium phenoxide and the poly(phenoxyphosphazene) so formed was subjected to molecular weight determinations. GPC analysis and viscosity measurements of the phenoxy-substituted polyphosphazene indicated the following values for average molecular weight and intrinsic viscosity [η]:
[η]: 0.21
Mw: 115,400
Mn: 35,500
Mw/Mn: 3.25

The phenoxy-substituted polyphosphazene used in these determinations was prepared in the following manner: 102 mL of the above polymer solution was diluted with 100 mL of toluene, the diluted solution was allowed to stand overnight to allow a trace amount of unreacted NH$_4$Cl to settle, and the clear solution was then reacted with 0.32 mole of sodium phenoxide in 200 mL of diglyme for 64 hours at 110° C. In this operation 26.9 g of poly(phenoxyphosphazene) was formed. The intrinsic viscosity of the poly(phenoxyphosphazene) was measured in tetrahydrofuran at 25° C.

EXAMPLE VII

Stage (i): Same as Example I.

Stage (ii): To a one liter, five-neck round bottom flask, cradled in a heating mantle and fitted with a mechanical stirrer, a condenser, a thermometer, a nitrogen inlet tube and a gas/vapor outlet tube were added 150 g of another portion of the same oligomer produced in stage (i) of Example I, 120 mL of 1,1,2,2-tetrachloroethane, and 15.5 g of ammonium chloride. The mixture was refluxed for six hours. The unreacted ammonium chloride (1.5 g) was separated from the reaction product by filtration. p$^{31}$ NMR analysis of a sample of the filtrate indicated the following product composition:
Cyclic (PNCl$_2$)$_3$: 6.1%
Cyclic (PNCl$_2$)$_4$: 4.3%
Higher cyclic oligomers: 4.5%
Linear PNCl$_2$ polymer: 83.3%
Other: 1.8%

The filtrate was added to n-hexane to separate linear phosphonitrilic chloride polymer from the cyclic phosphonitrilic chloride oligomers. The heavy, oily liquid linear phosphonitrilic chloride polymer was dried and then dissolved in toluene. A small sample of poly(phenoxyphosphazene) was prepared from the phosphonitrilic chloride polymer for molecular weight and intrinsic viscosity determinations (measured in tetrahydrofuran at 28° C.). The intrinsic viscosity and the average molecular weights as indicated by GPC analysis of the poly(phenoxyphosphazene) sample were as follows:
[η]: 0.11
Mw: 44,200
Mn: 29,660
Mw/Mn: 1.47

The phenoxy-substituted polyphosphazene used in these determinations was prepared in the following manner: 17.4 g of the above linear polymer was dissolved in 100 mL of toluene, and the clear solution was then reacted with 0.32 mole of sodium phenoxide in 200 mL of diglyme for 42 hours at 110° C. In this operation 30 g of poly(phenoxyphosphazene) was formed.

EXAMPLE VIII

Stage (i): Same as Example I.

Stage (ii): Another polymerization was conducted in accordance with the procedure of stage (ii) of Example VII except that the polymerization time was 11.5 hours. As in Example VII, a small sample of poly(phenoxyphosphazene) was prepared and subjected to molecular weight and intrinsic viscosity determinations in tetrahydrofuran, in this case at 25° C. The results of these determinations were as follows:

[η]: 0.27
Mw: 171,600
Mn: 56,500
Mw/Mn: 3.03

The linear phosphonitrilic chloride polymers produced in accordance with this invention are useful for a variety of applications. By way of example these linear polymers when of relatively low molecular weight are useful as intermediates in the synthesis of hydraulic fluids, lubricants and flame retardants. In particular the linear phosphonitrilic chloride polymers preferably having average degrees of polymerization below about 50 may be substituted with aryloxy and/or alkoxy groups to form products useful as hydraulic fluids, lubricants and flame retardants. Methods for effecting such substitution are well known in the art and are described for example in U.S. Pat. Nos. 3,443,913; 3,856,712; 3,883,451; and U.S. Pat. No. 4,055,523. Alternatively aryloxy and alkoxy substituted linear polymers of higher average degrees of polymerization containing ethylenic unsaturation can be compounded and cured by cross-linking to produce elastomers, coatings, adhesives, potting compounds, thermoset plastics and flexible or rigid foams. Note in this connection U.S. Pat. No. 4,264,531. Still other uses for the linear phosphonitrilic chloride polymers producible by the process of this invention will be apparent to those skilled in the art and are reported in the literature.

I claim:

1. A process for producing halophosphazene polymer which comprises (i) heating a nitrogen source with a stoichiometric excess of a phosphorous source so that hydrogen halide is evolved and halophosphazene is formed, said helophosphazene having the formula $$[X-(PX_2=N)_n-PX_3]^+PX_6^-$$

wherein n is a numeral which averages at least 3 and X is halogen, and (ii) heating at least a portion of the halophosphazene with at least a stoichiometric amount of nitrogen source so that hydrogen halide is evolved and substantially linear halophosphazene phazene polymer of higher molecular weight is formed.

2. A process of claim 1 wherein in (ii) a stoichiometic excess of the nitrogen source is employed.

3. A process of claim 1 wherein (i) is conducted in a liquid inert reaction medium.

4. A process of claim 3 wherein said medium is at least predominantly a halohydrocarbon.

5. A process of claim 3 wherein said medium is at least predominantly a nitroaromatic hydrocarbon.

6. A process of claim 3 wherein in (i) the mole ratio of phosphorus source:nitrogen source is in the range of above 1:1 to about 3:1.

7. A process of claim 6 wherein said mole ratio is in the range of from 1.1:1 to 1.5:1.

8. A process of claim 3 wherein in (i) the temperature falls within the range of from about 50° C. to about 200° C.

9. A process of claim 8 wherein said temperature falls within the range of from about 70° C. to about 150° C.

10. A process of claim 3 wherein at least a portion of (ii) is conducted in bulk.

11. A process of claim 3 wherein a first portion of (ii) is conducted in bulk and wherein a subsequent portion of (ii) is conducted in a liquid inert solvent.

12. A process of claim 11 wherein the solvent employed in (ii) is at least predominantly an aromatic hydrocarbon, a cycloaliphatic hydrocarbon, a halogenated hydrocarbon, or any mixture thereof.

13. A process of claim 3 wherein (ii) is performed in a liquid inert solvent.

14. A process of claim 13 wherein the solvent employed in (ii) is at least predominantly an aromatic hydrocarbon, a cycloaliphatic hydrocarbon, a halogenated hydrocarbon, or any mixture thereof.

15. A process of claim 13 wherein at least a portion of (ii) is conducted at superatmospheric pressure and hydrogen halide is continuously or periodically bled from the reaction system.

16. A process of claim 3 wherein (ii) is conducted at a temperature within the range of from about 100° C. to about 350° C.

17. A process for producing substantially linear chlorophosphazene polymer which comprises (i) heating a nitrogen source with a stoichiometric excess of a phosphorus source so that hydrogen chloride is evolved and chlorophosphazene is formed, said chlorophosphazene having the formula $$[CL-(CL_2=N)_n-PCl_3]^+PCl_6^-$$

wherein n is a numeral which averages at least 3, and (ii) heating at least a portion of the chlorophosphazene with at least a stoichiometric amount of a nitrogen source so that hydrogen chloride is evolved and substantially linear chlorophosphazene polymer of higher molecular weight is formed.

18. A process of claim 17 wherein in (i) the nitrogen source is ammonia or ammonium chloride or both, and the phosphorus source is phosphorus pentachloride or the combination of phosphorus trichloride and chlorine or a combination of all three of them.

19. A process of claim 17 wherein in (ii) the nitrogen source is ammonia or ammonium chloride.

20. A process of claim 17 wherein ammonium chloride is employed as the nitrogen source in at least (ii), the ammonium chloride having a mean particle size below 100 microns.

21. A process for producing substantially linear chlorophosphazene polymer which comprises (i) heating a nitrogen source with a stoichiometric excess of a phosphorus source in a liquid inert reaction medium so that hydrogen chloride and chlorophosphazene are formed, said chlorophosphazene having the formula $$[Cl-(PCl_2=N)_n-PCl_3]^+PCl_6^-$$

wherein n is a numeral which averages at least 3, and removing hydrogen chloride from the reaction mixture during the reaction; and (ii) heating at least a portion of the chlorophosphazene with an excess of a nitrogen source so that hydrogen chloride and substantially linear chlorophosphazene polymer of higher molecular weight are formed, and removing hydrogen chloride from the reaction mixture during the reaction.

22. A process of claim 21 wherein removal of hydrogen chloride during at least a portion of (ii) is effected by sweeping the heated reaction mixture during at least a portion of (ii) with an inert vapor or gas.

23. A process of claim 22 wherein in (ii) cyclic chlorophosphazene oligomer is also removed from the reaction mixture along with hydrogen chloride.

24. A process of claim 21 wherein removal of hydrogen chloride during at least a portion of (ii) is effected by reducing the pressure on the heated reaction mixture during at least a portion of (ii) to below atmospheric pressure.

25. A process of claim 24 wherein in (ii) cyclic chlorophosphazene oligomer is also removed from the reaction mixture along with hydrogen chloride.

26. A process of claim 21 wherein removal of hydrogen chloride during at least a portion of (ii) is effected by conducting at least a portion of (ii) in a boiling inert solvent whereby the solvent vapors drive off hydrogen chloride.

27. A process of claim 26 wherein in (ii) cyclic chlorophosphazene oligomer is also removed from the reaction mixture along with hydrogen chloride.

28. A process of claim 21 wherein in (ii) a stoichiometric excess of the nitrogen source is employed and at least a portion of (ii) is conducted substantially in bulk.

29. A process for producing substantially linear halophosphazene polymer which comprises (i) heating a nitrogen source with a stoichiometric excess of a phosphorus source so that hydrogen halide is evolved and halophosphazene is formed, said halophosphazene having the formula

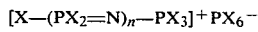

wherein is a numeral which averages at least 3 and X is halogen, (ii) heatIng at least a portion of such halophosphazene with at least a stoichiometric amount of a nitrogen source so that hydrogen halide is evolved and substantially linear halophosphazene Polymer of the higher molecular weight is formed, and (iii) heating at least a portion of such halophosphazene polymer in an inert liquid diluent to increase the molecular weight of the halophosphazene polymer so formed.

30. A process of claim 29 wherein hydrogen halide is removed from the reaction mixture either continuously or periodically during at least a portion of (ii) and during at least a portion of (iii).

31. A process of claim 29 wherein (ii) and (iii) are conducted on a substantially continual basis.

32. A process of claim 29 wherein at least a portion of (ii) is conducted substantially in bulk and wherein said diluent in (iii) is at least predominantly an aromatic hydrocarbon, a cycloaliphatic hydrocarbon, a halogenated hydrocarbon, or any mixture thereof.

33. A process of claim 29 wherein the phosphorus source in (i) is phosphorus pentachloride or a combination of phosphorus trichloride and chlorine or a combination of all three of them, wherein the nitrogen source in (i) and (ii) is ammonia or ammonium chloride or both of them, and wherein hydrogen chloride formed in (i), (ii) and (iii) is removed from the reaction mixtures thereof.

34. A process of claim 33 wherein the nitrogen source at least in (ii) is ammonium chloride having a mean particle size below about 100 microns.

35. A process of claim 29 wherein at least a portion of (iii) is conducted at superatmospheric pressure and hydrogen halide is continuously or periodically bled from the reaction system.

36. A process of claim 29 wherein (iii) is conducted at a temperature within the range of from about 100° C. to about 350° C.

37. A process of claim 1 wherein (i) and (ii) are conducted on a substantially continual basis by introducing at least a portion of the nitrogen source material for (ii) into the reaction mixture from (i) so that the reaction mixture contains at least a stoichiometric amount of the nitrogen source material relative to the halophosphazene from (i).

* * * * *

UNITED STATES PATENT AND TRADEMARK OFFICE
CERTIFICATE OF CORRECTION

PATENT NO. : 4,551,317            Page 1 of 3

DATED : NOVEMBER 5, 1985

INVENTOR(S) : HSUEH M. LI

It is certified that error appears in the above-identified patent and that said Letters Patent is hereby corrected as shown below:

Column 1, line 51, reads "$[Cl(PCl_2=N)_6PCl_3]PCL_6$" and should read -- $[Cl(PCl_2=N)_6PCl_3]PCl_6$ --.

Column 3, line 38, reads "haIogenated" and should read -- halogenated --.

Column 3, line 58, a new paragraph should begin at "Japanese".

Column 4, line 35, reads "halophosphaZene" and should read -- halophosphazene --.

Column 5, line 64, reads "$[X-(PX_2=N)_n-PX_3]^+PX_6^{31}$" and should read --
$[X-(PX_2=N)_n-PX_3]^+PX_6^-$ --.

Column 6, line 12, reads "$[X-(PX_2=N)_n-PX_3]^{30}X^-$" and should read -- $[X-(PX_2=N)_n-PX_3]^+X^-$ --.

UNITED STATES PATENT AND TRADEMARK OFFICE
CERTIFICATE OF CORRECTION

PATENT NO. : 4,551,317

DATED : NOVEMBER 5, 1985

INVENTOR(S) : HSUEH M. LI

It is certified that error appears in the above-identified patent and that said Letters Patent is hereby corrected as shown below:

Column 6, line 30, reads "$[X-(PX_2=N)_n PX_3]^{30} PX_6^-$" and should read -- $[X-(PX_2=N)_n PX_3]^+ PX_6^-$ --.

Column 10, line 14, reads "conentional" and should read -- conventional --.

Column 11, line 58, reads "miXture" and should read -- mixture --.

Column 16, line 32, reads "$p^{31}$ NMR" and should read -- $P^{31}$ NMR --.

Column 17, line 38, reads "helophosphazene" and should read -- halophosphazene --.

Column 17, line 46, reads "halophosphazene phazene polymer" and should read -- halophosphazene polymer --.

Column 18, line 29, reads "$[CL-(CL_2 N)_n-PCl_3] PCl_6$" and should read -- $[Cl-(PCl_2=N)_n-PCl_3]^+ PCl_6^-$ --.

UNITED STATES PATENT AND TRADEMARK OFFICE
CERTIFICATE OF CORRECTION

PATENT NO. : 4,551,317
DATED : NOVEMBER 5, 1985
INVENTOR(S) : HSUEH M. LI

It is certified that error appears in the above-identified patent and that said Letters Patent is hereby corrected as shown below:

Column 19, line 33, reads "wherein is" and should read -- wherein n is --.

Column 19, line 34, reads "heatIng" and should read -- heating --.

Column 19, line 37, reads "Polymer of the higher" and should read -- polymer of higher --.

Signed and Sealed this

Eighth Day of April 1986

[SEAL]

*Attest:*

DONALD J. QUIGG

*Attesting Officer*  *Commissioner of Patents and Trademarks*